United States Patent [19]
Klingler

[11] 3,938,388
[45] *Feb. 17, 1976

[54] THERMOMETER
[75] Inventor: Josef F. Klingler, Wilmette, Ill.
[73] Assignee: Thermex, Inc., Chicago, Ill.
[ * ] Notice: The portion of the term of this patent subsequent to June 19, 1990, has been disclaimed.
[22] Filed: Apr. 6, 1973
[21] Appl. No.: 348,589

[52] U.S. Cl. ................................. 73/371
[51] Int. Cl.² .......................... G01K 5/08
[58] Field of Search........... 73/371, 372, 374, 343 R

[56] References Cited
UNITED STATES PATENTS

| | | | |
|---|---|---|---|
| 1,350,158 | 8/1920 | Hurlburt | 73/371 |
| 1,892,689 | 1/1933 | Wilhelm | 73/371 |
| 1,942,517 | 1/1934 | Noyes | 73/371 |
| 2,633,025 | 3/1953 | Boice | 73/343 R |
| 3,739,642 | 6/1973 | Klinger | 73/371 |

OTHER PUBLICATIONS
Publication "Evolution of the Thermometer (1592–1743)", H. C. Bolton, 1900 QC271 B69, (pp. 28–33, 60–65 and 80–83).

Primary Examiner—S. Clement Swisher
Assistant Examiner—Denis E. Corr
Attorney, Agent, or Firm—Hofgren, Wegner, Allen, Stellman & McCord

[57] ABSTRACT

A thermometer adapted to be subjected to temperatures above the normal reading temperature range thereof without adversely affecting the accuracy of the thermometer in subsequent use thereof at the reading temperatures. The thermometer is adapted for use as a clinical thermometer having a normal reading temperature range of below 100°F. and is constructed to provided such maintained accuracy notwithstanding subjection of the thermometer to elevated temperatures such as 140°F. or more.

17 Claims, 5 Drawing Figures

THERMOMETER

BACKGROUND OF THE INVENTION

1. Field of the Invention

This invention relates to thermometers utilizing an expandable liquid to provide temperature reading, and in particular to means for permitting such thermometers to be subjected to elevated temperatures without destroying the accuracy thereof.

2. Description of the Prior Art

An improved thermometer construction is shown in my copending U.S. Patent application Ser. No. 121,269, filed Mar. 5, 1971, now U.S.Pat. No. 3,739,642, for an Open End Thermometer. Disclosed therein is an improved thermometer construction utilizing a capillary bore having an open end permitting the indicator liquid to be exposed to ambient pressure at all times while precluding flow of the indicator liquid outwardly therefrom, as a result of the outer end of the bore having a capillary cross section.

While the indicator liquid is prevented from flowing outwardly from the thermometer notwithstanding an inverted disposition thereof, if the thermometer is subjected to a temperature substantially above the normal reading temperature range, the indicator liquid may be expanded sufficiently to permit a portion thereof to pass outwardly through the open end of the capillary bore. This arrangement provides a substantial improvement over the conventional clinical thermometers having sealingly closed capillary bores as subjection of such closed thermometers to high temperatures provides substantial stresses therein which may result in shattering or exploding of the thermometers.

Because of this, it has been conventional in the clinical thermometer field to limit the temperatures at which the clinical thermometers are to be stored to 140°F. or less. Such limitation has served two purposes —one, to prevent such shattering or exploding, and secondly, to prevent distortion of the glass which could destroy the necessary accuracy of the thermometer.

SUMMARY OF THE INVENTION

The present invention comprehends an improved thermometer which is adapted to permit subjection thereof to elevated temperatures without such shattering or exploding, or affecting the accuracy in subsequent normal use and, thus, provides a substantial improvement over the conventional hermetically sealed thermometers in use today.

More specifically, applicant's invention comprehends such an improved thermometer having means for receiving thermally expanded indicator liquid from the capillary bore thereof as an incident of subjection of the thermometer to an elevated temperature above the reading temperature range, and returning the thermally expanded indicator liquid to the capillary bore as an incident of subjection of the thermometer to a temperature below the elevated temperature, and means for subjecting the indicator liquid to ambient pressure at all times.

More specifically, the means for receiving the expanded indicator liquid defines an expansion chamber communicating with the bore outwardly of the scale means and defining an open outlet at its outer distal end having a small cross section precluding gravitational flow of the indicator liquid outwardly therethrough, the expansion chamber being arranged to accommodate a preselected volume of indicator liquid thermally expanded into said expansion chamber thereby to preclude loss of indicator liquid from the thermometer by thermal expansion through the outlet notwithstanding the subjecting of the thermometer to elevated temperatures substantially above the reading temperatures.

The expansion chamber illustratively herein comprises a capillary bore have a cross section larger than the cross section of the capillary through-bore adjacent the scale means. The outlet may have a cross section smaller than the cross section of the expansion chamber bore for improved retention of the indicator liquid while yet assuring maintained ambient pressure conditions on the indicator liquid.

The expansion chamber may be preselected to accommodate such an elevated temperature of 140°F. or more.

The thermometer stem may be formed of a synthetic resin for low cost disposable construction.

Thus, the present invention comprehends an improved thermometer which is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
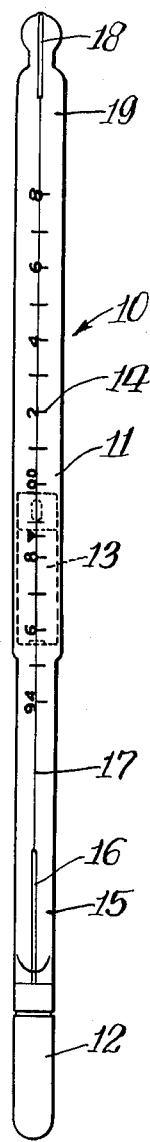
FIG. 1 is a front elevation of a thermometer embodying the invention.

In the exemplary embodiment of the invention as disclosed in the drawing, a thermometer generally designated 10 is shown to comprise a stem, or capillary element, 11 and a reservoir bulb 12. A reading holding means generally designated 13 is provided on the stem for permanently holding the reading whereby the thermometer is adapted for a one-time use operation. The use of the reading holding means 13 is optional and the thermometer may be utilized for repeated readings as desired. However, the thermometer is adapted to be used as a low cost clinical thermometer by virtue of the forming of stem 11 of molded plastic and bulb 12 of formed metal, such as aluminum, so that use of the permanent holding means 13 assures prevention of cross infection and the like by causing the thermometer to be used for only a single temperature reading operation.

Figure 2:
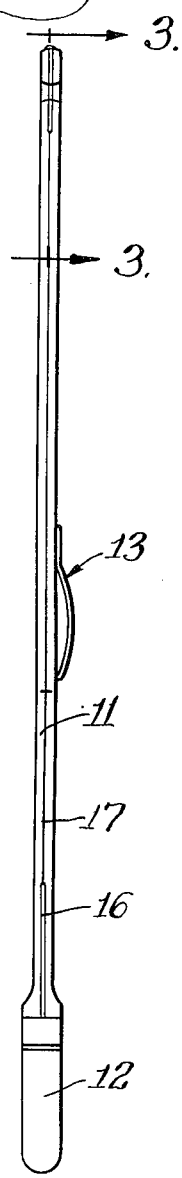
FIG. 2 is a side elevation thereof.

As best seen in FIGS. 1 and 2, stem 11 may comprise an elongated flattened element provided at a mid-portion thereof with a scale 14. Bulb 12 is connected to the lower end 15 of the stem and is filled with a suitable indicator liquid 16 which extends upwardly through the capillary bore 17 longitudinally of stem 11 to provide the desired temperature reading by observation of the miniscus at the top of the column of the indicator liquid adjacent scale 14.

As discussed above, thermometer 10 may comprise a clinical thermometer and, thus, scale 14 may illustratively cover a normal reading range of from 94°F. to 108°F.

Figure 3:
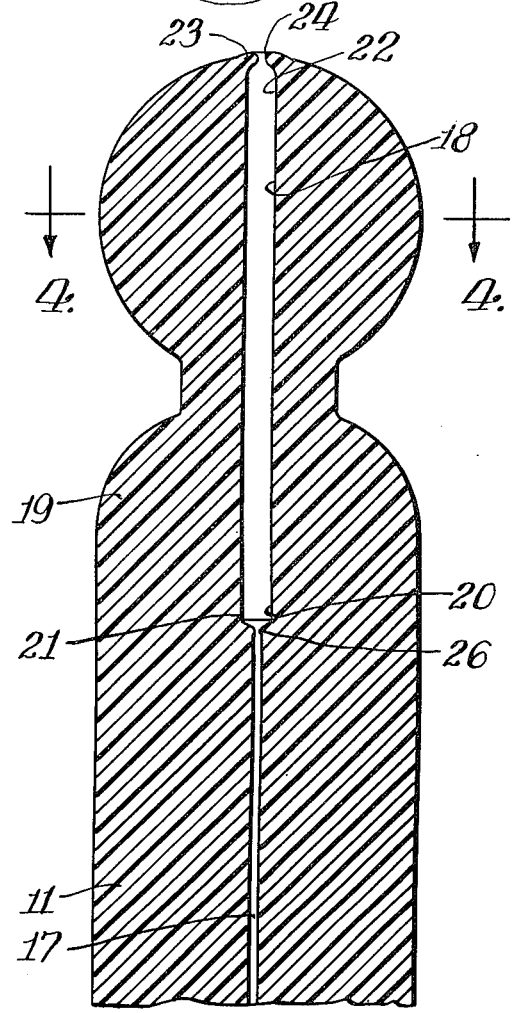
FIG. 3 is a fragmentary enlarged longitudinal section thereof taken substantially along the line 3—3 of FIG. 2.
Figure 4:
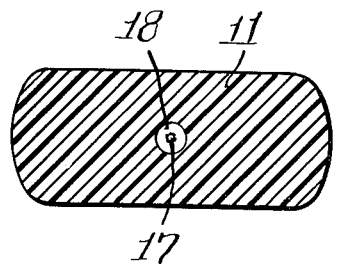
FIG. 4 is a transverse section taken substantially along the line 4—4 of FIG. 3.

As discussed above, the present invention comprehends an improved construction of thermometer 10 which permits subjection of the thermometer to temperatures above the normal reading temperature range thereof without adversely affecting the accuracy of the thermometer in subsequent use thereof at reading temperatures. More specifically, the invention comprehends providing in the thermometer means for receiving thermally expanded indicator liquid from capillary bore 17 as an incident of subjection of the thermometer to an elevated temperature above the reading temperature range, and returning the thusly thermally expanded indicator liquid to capillary bore 17 as an incident of subjection of the thermometer to a temperature below the elevated temperature. In the illustrated embodiment, this means illustratively comprises an expansion chamber 18 at the upper end 19 of stem 11 having an inner, or lower end, 20 communicating with capillary bore 17 upwardly, or outwardly, of scale 14. As shown in FIG. 3, the lower end of expansion chamber 18 is defined by a frustoconical surface 21 coaxially opening to bore 17. The upper, or distal, end 22 of the expansion chamber is partially closed by an outlet means 23 defining a capillary section opening 24 having a transverse cross section substantially smaller than the cross section of expansion chamber 18. In the illustrated embodiment, wherein the thermometer comprises a clinical thermometer having the aforesaid normal reading range of 94° to 108° Fahrenheit, expansion chamber 18 is adapted to receive thermally expanded indicator liquid from the upper end of capillary bore 17 in a sufficient volume to permit subjection of the thermometer to temperatures of at least approximately 140°F. without expansion thereof upwardly through opening 24. The invention comprehends any suitable preselected volume to be utilized relative to expansion chamber 18 and, illustratively, comprehends permitting subjection of the thermometer to temperatures as high as 212°F. or more without loss of the indicator liquid through opening 24.

As indicated above, outlet means 23 defines a small opening 24 which maintains the indicator liquid 16 under ambient atmospheric pressure at all times so as to avoid development of stresses in the thermometer and which would otherwise adversely affect the maintained accuracy thereof. Thus, thermometer 10 is particularly advantageously adaptable for use as a clinical thermometer wherein high standards of accuracy must be maintained. On the other hand, by permitting subjection of the thermometer to a wide range of temperatures over the normal operating range, storage requirements are substantially simplified, thus further reducing the cost of the use of the thermometer. As thermal expansion of the indicator liquid outwardly through opening 24 is effectively precluded, need for means for indicating such undesired leakage are obviated, thus again reducing the cost of the thermometer while yet assuring the high accuracy necessary for such clinical use.

As indicated above, the thermometer may be formed of low cost molded plastic, and illustratively, may be formed of polypropylene.

Figure 5:
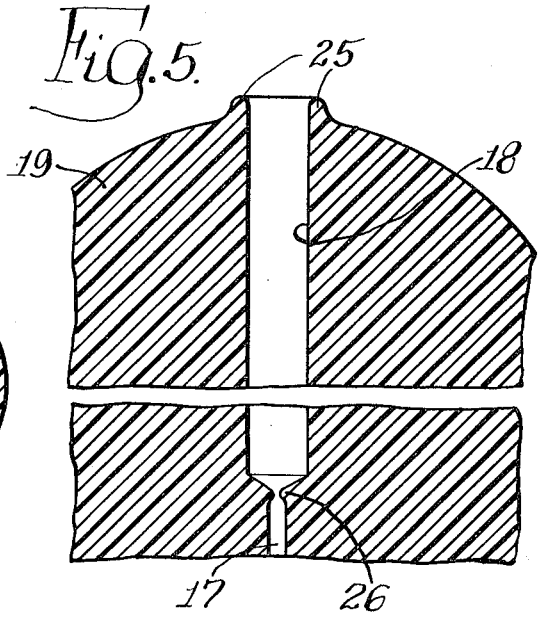
FIG. 5 is a fragmentary longitudinal section illustrating the arrangement of the distal end of the stem prior to the forming of the capillary outlet opening.

Outlet means 23 may be formed originally as a pair of lips 25, as shown in FIG. 5, and may be pressed toward each other by suitable heated means (not shown) to the configuration of FIG. 3. Expansion chamber 18 may be of relatively small diameter so as to also comprise a capillary bore. Herein, the term capillary, as applied to bore 17, chamber 18, and opening 24, is defined as of being of sufficiently small size so as to cause a liquid surface extending thereacross to be maintained substantially transversely thereacross by virtue of its surface tension notwithstanding inversion or other similar disposition of the structure and notwithstanding subjection of the structure to vibration. In the illustrated embodiment wherein thermometer 10 comprises a clinical thermometer, capillary bore 17 may have a diameter of approximately 0.006 inch, and expansion chamber 18 illustratively may have a diameter in the range of approximately 0.02 to 0.03inch. In one form, the expansion chamber is provided by drilling the end of the stem. It has been found that such an expansion chamber having a length of approximately ⅝ inch or more can be readily so drilled. Further illustratively, the expansion chamber may be formed by molding concurrently with molding of the capillary bore.

Where the expansion chamber is formed as by drilling, a small constriction 26 may be formed in the upper end of capillary bore 17 as a result of the drilling action. Constriction 26 functions in conjunction with opening 24 to provide a series of restricted openings between the capillary bore and atmosphere for further effectively partially segregating the capillary bore from the ambient atmosphere conditions while effectively maintaining atmospheric pressure on the indicator liquid at all times.

While expansion chamber 18 has been shown as a single diameter cylindrical bore, as will be obvious to those skilled in the art, stepped diameter sections may be provided as desired.

Illustratively, the indicator liquid may comprise a glycol phenyl ether, such as ethylene glycol phenyl ether.

The foregoing disclosure of specific embodiments is illustrative of the broad inventive concepts comprehended by the invention.

I claim:

1. In a thermometer adapted to be subjected to temperatures above the normal reading temperature range thereof without adversely affecting the accuracy of the thermometer in subsequent use thereof at reading temperatures, said thermometer having a stem provided with a longitudinal capillary through-bore, means defining a reservoir chamber at an inner end of the bore, scale means on the stem for indicating reading temperatures, and indicator liquid in said chamber and expandable as an incident of subjecting of the thermometer to reading temperatures to extend outwardly through said bore to adjacent said scale for providing a reading of the temperature, the improvement comprising means defining an expansion chamber communicating with said bore outwardly of the scale means and defining an open outlet at its outer distal end having a capillary cross section precluding gravitational flow of the indicator liquid outwardly therethrough, said expansion chamber being arranged to accommodate a preselected volume of indicator liquid thermally expanded into said expansion chamber thereby to preclude loss of indicator liquid from the thermometer by thermal expansion through said outlet notwithstanding the subjecting of the thermometer to elevated temperatures substantially above said reading temperatures and permitting return of substantially all of the preselected volume of expanded indicator liquid upon lowering of the subjected temperature.

2. The thermometer of claim 1 wherein said expansion chamber comprises a capillary bore having a cross section larger than the cross section of said capillary through-bore.

3. The thermometer of claim 1 wherein said expansion chamber comprises a capillary bore having a cross section larger than the cross section of said stem capillary through-bore, said outlet having a cross section smaller than the cross section of said expansion chamber capillary bore.

4. The thermometer of claim 1 wherein said thermometer comprises a clinical thermometer having a maximum reading temperature less than 120°F. and said expansion chamber is preselected to prevent expansion of indicating liquid outwardly through said outlet at elevated temperatures up to at least approximately 140°F.

5. The thermometer of claim 1 wherein said expansion chamber comprises a drilled hole having a length of less than approximately ½inch.

6. The thermometer of claim 1 wherein said thermometer comprises a clinical thermometer having a maximum reading temperature less than 120°F. and said expansion chamber is preselected to prevent expansion of indicating liquid outwardly through said outlet at elevated temperatures substantially greater than 140°F.

7. The thermometer of claim 1 wherein the stem is formed of molded synthetic resin.

8. The thermometer of claim 1 wherein said expansion chamber comprises a capillary bore having a cross section at least approximately three times larger than the cross section of said stem capillary through-bore.

9. The thermometer of claim 1 wherein said outlet is defined by a thermally deformed end of said stem.

10. The thermometer of claim 1 wherein said expansion chamber comprises a cylindrical bore coaxially of said capillary bore.

11. The thermometer of claim 1 wherein said expansion chamber comprises a cylindrical bore coaxially of said capillary bore and having a length substantially less than the longitudinal extent of said scale means.

12. The thermometer of claim 1 wherein said expansion chamber comprises a cylindrical bore coaxially of said capillary bore and having a frustoconical inner end opening to the outer end of said capillary bore.

13. In a thermometer adapted to be subjected to temperatures above the normal reading temperature range thereof without adversely affecting the accuracy of the thermometer in subsequent use thereof at reading temperatures, said thermometer having a stem provided with a longitudinal capillary through-bore, means defining a reservoir chamber at an inner end of the bore, scale means on the stem for indicating reading temperatures, and indicator liquid in said reservoir chamber and expandable as an incident of subjecting of the thermometer to reading temperatures to extend outwardly from said chamber through said bore to adjacent said scale for providing a reading of the temperature, the improvement comprising: means defining an expansion chamber for receiving thermally expanded indicator liquid from the capillary bore as an incident of subjection of the thermometer to an elevated temperature above said reading temperature range, and returning said thermally expanded indicator liquid to said capillary bore as an incident of subjection of the thermometer to a temperature below said elevated temperature; and means for subjecting said expansion chamber to ambient pressure at all times.

14. The thermometer of claim 13 wherein said indicator liquid receiving means comprises means communicating with said capillary bore at all times.

15. The thermometer of claim 13 wherein said pressure subjecting means comprises means defining an opening to atmosphere from said indicator liquid receiving means and means for providing communication between said capillary bore and said indicator receiving liquid means at all times.

16. The thermometer of claim 13 wherein said elevated temperature is at least 1°F. above said reading temperature range.

17. The thermometer of claim 13 wherein said stem is formed of a synthetic resin.

* * * * *